United States Patent [19] [11] 4,299,708
James [45] Nov. 10, 1981

[54] FIRE-EXTINGUISHING OR FIRE-PREVENTIVE COMPOSITION

[76] Inventor: Trevor M. James, 65 Herbert St., Pontardawe, Swansea, Wales

[21] Appl. No.: 41,749

[22] Filed: May 23, 1979

[30] Foreign Application Priority Data

May 25, 1978 [GB] United Kingdom ............... 22566/78

[51] Int. Cl.[3] .......................... A62D 1/00; C09K 3/28

[52] U.S. Cl. .......................................... 252/2; 252/7; 252/607

[58] Field of Search ...................... 252/2, 8.1, 88, 604; 8/6.5, 498

[56] References Cited

U.S. PATENT DOCUMENTS

| | | | |
|---|---|---|---|
| 958,007 | 5/1910 | Porteus | 252/88 |
| 2,385,500 | 9/1945 | Fasold et al. | 252/2 |
| 2,388,014 | 10/1945 | Sargent et al. | 252/2 |
| 2,692,861 | 10/1954 | Weeks | 252/88 |
| 3,925,001 | 12/1975 | Gurtler | 8/6.5 X |

FOREIGN PATENT DOCUMENTS

| | | | |
|---|---|---|---|
| 293892 | 7/1928 | United Kingdom | 252/88 |
| 1411086 | 10/1975 | United Kingdom | 252/88 |

*Primary Examiner*—Richard D. Lovering
*Attorney, Agent, or Firm*—Young & Thompson

[57] ABSTRACT

A fire extinguishing or fire preventing composition comprising sawdust combined with a dry coloring material which reacts with the sawdust at elevated temperature to improve the fire extinguishing properties. In one form the coloring material comprises a transition metal compound such as ferric oxide $Fe_2O_3$ which forms complexes with glucose units derived from the cellulose in sawdust. In another form the coloring material is organic, for example, an azo-compound which forms a complex with the cellulose in the sawdust, and this also improves the fire extinguishing properties.

3 Claims, No Drawings

FIRE-EXTINGUISHING OR FIRE-PREVENTIVE COMPOSITION

This invention relates to compositions for fire extinguishing or prevention, and is particularly concerned with such compositions based on sawdust.

Though sawdust itself is impermeable, it has been discovered that when quantities of various metal salts, particularly sodium chloride, are intimately intermingled it has excellent fire prevention properties. Other suitable metal salts are, for example, sodium and potassium bicarbonate.

It is, however, important that untreated sawdust should not be used by accident when the proper fire extinguishing sawdust is required, and accordingly it is an object of the invention to provide an improved sawdust composition which will at least partly overcome this difficulty.

Broadly stated, the invention consists in a fire extinguishing or fire preventive composition comprising sawdust in loose particulate form, having dispersed or incorporated therein a colouring material.

Preferably, the colouring material is a dry, powdered material. The composition preferably includes sodium chloride.

The colouring material may contain a transition metal compound or, alternatively, the colouring material may be an organic dyestuff capable of forming a stable complex with cellulose, or the glucose units in cellulose, at elevated temperatures. The preferred organic dyestuff is an azo-compound.

Preferably, the colouring material contains a high proportion of an iron compound in its $Fe^{III}$ oxidation state, and especially preferred is ferric oxide, $Fe_20_3$. It has been found, surprisingly, that the presence of even small quantities of $Fe_2O_3$ in the sawdust has an important effect on the fire extinguishing properties.

The reason for this is not known with certainty, but it is thought that it is due to the octahedral complex formation ability of iron (III). It is known that iron (III) has its greatest affinity for ligands which co-ordinate via oxygen, especially polyols such as glycerine and sugars. It is believed that when the sawdust is exposed to high temperatures there is a partial breakdown of the cellulose chain into smaller glucose units which then co-ordinate with iron (III) via oxygen to produce a complex which is stable at such high temperatures. The complexing ability of iron (III) is so strong that the surprising results are achieved even with small amounts of $Fe_2O_3$ in the sawdust.

The invention may be performed in various ways, but in one particular example the iron (III) can conveniently be introduced into the sawdust in the form of the colouring material Venetian Red V.101, which is a mixture having the following constitution:

Oil Absorption—16.25
$Fe_2O_3$—8.78%
$SiO_2$—1.6%
$Al_2O_3$—2.73%
CaO—0.3%
MgO—0.002%
$MnO_2$—0.01%
Lead—1000 ppm
BaO—2 ppm
$SO_3$—0.061%
$CO_2$—0.006%
$CaSO_42H_2O$—85.5%
pH—5.6
S.G.—4.9

The large percentage (85.5%) of calcium sulphate dihydrate, $CaSO_42H_2O$, in Venetian Red is thought to assist in the breakdown of the cellulose into lignin and pure cellulose as an aid to the further breakdown of cellulose into the smaller glucose units. The acidic nature of the colouring material (pH5.6) is also thought to help in this degradation of the sawdust.

Not only does iron (III) have this surprising complex forming ability, but other transition metal compounds may be used in colouring materials with a similar advantageous effect. Venetian Red is particularly suitable as a colouring material when the sawdust composition is intended as a fire extinguisher for normal fire risks. The proportion of sodium chloride may be as little as 5%.

In another example, where the composition is designed especially for situations where there is a risk of spillage of sulphuric acid, the composition comprises softwood sawdust 69%, sodium chloride 30%, green dry powder colouring 1%.

It has also been found, surprisingly, that organic dyestuffs, particularly azo-compounds, can form complexes with the glucose units of cellulose, the complexes being stable at high temperatures. It is not known with certainty why these stable fire resistant complexes are formed at elevated temperatures, but it is thought that the complex bonding effect, in the case of azo-compounds, occurs with oxygen atoms in the glucose units interacting directly with the —N═N— group in the dyestuff. This interaction takes place at elevated temperatures. It has also been found that certain B-naphthal azo derivatives, and azo resorcinol derivatives, have fire retardant properties and are suitable colouring materials for the sawdust. The fire retardant effect is in addition to the complex formation property described above.

The colouring materials employed in the invention may be used as dry powdered materials, or as liquid suspensions, or as liquid mixtures or solutions. If a liquid is employed, the sawdust becomes impregnated with the colouring material, and any remaining liquid can be removed to leave behind a relatively dry, coloured sawdust composition.

A particularly preferred colouring is that sold by G. V. Barrett & Co., of Tower Lane, Wormsley, Bristol.

Another green colouring is made by Haessner Ltd., of the Industrial Estate, Station Road, Chepstow, Gwent.

The term "sawdust" as used herein is intended to mean not only the product of an operation of sawing timber, but also any finely comminuted wood or like particles of vegetable origin however produced.

I claim:

1. A fire extinguishing or fire-preventive composition comprising sawdust in loose, dry, particulate form having dispersed or incorporated therein sodium chloride in powder form and a dry powdered colouring material including calcium sulphate and a substance selected from the group consisting of a transition metal oxide and an organic dyestuff forming a stable complex with cellulose, or glucose units in cellulose, as present in said sawdust, at elevated temperatures.

2. A composition according to claim 1, in which said transition metal oxide is iron oxide.

3. A composition according to claim 1, in which the organic dyestuff is an azo compound which forms a stable complex with cellulose at high temperatures.

* * * * *